United States Patent Office 2,743,263
Patented Apr. 24, 1956

2,743,263

PROCESS FOR POLYMERIZING ACRYLONITRILE IN THE PRESENCE OF SULFONIC ACIDS

Harry W. Coover, Jr., Joseph B. Dickey, and Theodore E. Stanin, Kingsport, Tenn., assignors to Eastman Kodak Company, Rochester, N. Y., a corporation of New Jersey No Drawing. Application August 25, 1952,
Serial No. 306,311

13 Claims. (Cl. 260—88.7)

This invention relates to an improved process for preparing polymers (both the homopolymer and interpolymers) of acrylonitrile.

This application is a continuation-in-part of our application Serial No. 49,653, filed September 16, 1948, now abandoned.

Polymers of acrylonitrile and numerous methods for their preparation have been described previously in the chemical literature, and both foreign and domestic patents. More recently, it has been proposed to use polymers of acrylonitrile in the manufacture of synthetic fibers or films. The use of these polymers for this purpose has been somewhat limited due to the difficulty of obtaining a polymer having the desired solubility properties, as well as the property of giving uniformly colorless fibers when their solutions are spun through a spinneret into a precipitating bath. The polymers of acrylonitrile previously employed have an undesirable tendency to give gelled particles when dissolved in a solvent, such as dimethylformamide. These gelled particles can be dissolved to some degree by heating, however, the heating causes discoloration of the fibers spun from a heated solution, and if the solution is cooled to room temperature again, the gelled particles generally reappear. If these gelled particles are allowed to remain suspended in the solution the spinnerets become clogged during the spinning and the fiber obtained is uneven and of low tensile strength. Equally important, the fibers produced by spinning solutions of polymers of acrylonitrile made by the methods heretofore employed are not white in color, but have an undesirable brownish color which makes them difficult to use without further treatment, which materially lowers the strength and uniformity of the fibers. It can thus be seen that it is highly desirable to provide a process for manufacturing polymers of acrylonitrile which give uniform, gel-free solutions, and whose solutions when spun into a coagulating bath give lustrous, colorless fibers.

A further difficulty encountered in working with polymers of acrylonitrile containing large quantities of acrylonitrile in th polymer molecule (usually on the order of from 80 to 100 per cent by weight) has been the property of these polymers to show such limited solubility in the usual organic solvents, such as acetone. This difficulty has served to stimulate a widespread program of experimentation in the art to find suitable solvents that would increase the utility of polymers of acrylonitrile which have long been recognized as having properties of considerable economic importance. Dimethylformamide is perhaps one of the more common solvents which is in use at present for dissolving these polymers; however, this substance is toxic to use, thus constituting a hazard which has to be reckoned with when used in a confined area, such as a factory. Dimethylformamide is subject to further objection because of its lack of stability and tendency to release dimethylamine. A solvent which would overcome these difficulties would, therefore, be most useful in increasing the use of polymers of acrylonitrile in the preparation of white fibers and colorless films.

It is, accordingly, an object of our invention to provide an improved process for preparing polymers of acrylonitrile. A further object is to provide polymers of acrylonitrile which can be dissolved in solvents to give gel-free solutions. A still further object is to provide solutions of polymers of acrylonitrile which give lustrous, colorless fibers when spun into a coagulating bath. Another object is to provide a solvent for dissolving polymers of acrylonitrile, which is not as toxic as dimethylformamide and gives stable solutions. Other objects will become apparent from a consideration of the following description and examples.

According to the process of our invention, we accomplish the above objects by polymerizing acrylonitrile (either homopolymerizing or interpolymerizing) in an aqueous solution in the presence of an oxygen acid of sulfur selected from those represented by the following general formula:

$$R\text{—}SO_3H$$

wherein R represents a hydrocarbon group, such as alkyl (e. g. methyl, ethyl, etc.) or an aromatic group (e. g. phenyl, o-, p-tolyl, etc.). Acids which have been found to be especially useful include alkanesulfonic acids containing from 1 to 2 carbon atoms (methanesulfonic acid, ethanesulfonic acid, etc.) and an aromatic sulfonic acid of the benzene series (e. g. benzenesulfonic acid, o-, p-toluenesulfonic acids, xylenesulfonic acids, etc.).

We have further found that our polymers of acrylonitrile can be readily dissolved in N,N-dimethylacetamide to give solutions which are not as toxic as dimethylformamide, and which overcome other difficulties inherent in the use of dimethylformamide. For reasons which are not readily apparent, the polymers of acrylonitrile previously prepared by prior art processes will not dissolve in N,N-dimethylacetamide sufficiently to give solutions suitable for spinning, although they do dissolve completely in dimethylformamide. Since N,N-dimethylacetamide was not a suitable solvent for the polymers previously prepared, it was most surprising to find that it was excellently suited for dissolving polymers prepared by the present process. The preparation of polymer solutions from N,N-dimethylacetamide is, therefore, closely related to our improved process for preparing polymers of acrylonitrile.

In our polymerization of acrylonitrile, we advantageously add the acrylonitrile to a quantity of water which is sufficient to dissolve a substantial portion of the acrylonitrile. Generally the amount of water present dissolves about 75 per cent of the acrylonitrile added, the remaining acrylonitrile forming a dispersion in the aqueous solution. As the polymerization proceeds, the polymerized acrylonitrile precipitates out of solution and more of the dispersed acrylonitrile goes into solution. In practicing our invention, it is not essential that all of the acrylonitrile be dissolved in the aqueous reaction medium at one time, since a dispersion of acrylonitrile inherently has some of the acrylonitrile dissolved in the aqueous phase. The oxygen acid of sulfur selected from those described above can be dissolved in water and the acrylonitrile then added, or the acrylonitrile can be added to the water first and the oxygen acid of sulfur added subsequently. The quantity of oxygen acid of sulfur selected from those described above varies and depends on the volume of water present, the quantity of materials being polymerized, etc. Sufficient oxygen acid of sulfur selected from those described above should be used to maintain a pH of from 1 to 3 throughout the polymerization, since we have found polymerizations carried out outside this range do not give polymers having desirable characteristics, even where oxygen acid of sulfur is employed. We have found the polymers having especially desirable properties are obtained when the polymerization is carried out at a pH of from 1.5 to 2.0, although the broader range of 1 to 3.0 is adequate for most purposes.

The polymerization is effected in the presence of an alkali metal persulfate polymerization catalyst (i. e. persulfates of the elements of Group I of the periodic table, such as sodium, potassium, lithium, etc.), or ammonium persulfate, and a water-soluble inorganic compound of sulfur selected from the group consisting of alkali metal and ammonium bisulfites, such as sodium bisulfite, potassium bisulfite, ammonium bisulfite, etc.; alkali metal and ammonium sulfites, such as sodium sulfite, potassium sulfite, ammonium sulfite, etc.; alkali metal and ammonium thiosulfates, such as sodium thiosulfate, potassium thiosulfate, ammonium thiosulfate, etc.; alkali metal sulfides, such as sodium sulfide, potassium sulfide, sodium hydrosulfide (NaSH), potassium hydrosulfide (KSH), etc.; ammonium sulfides, such as ammonium sulfide and ammonium hydrosulfide, hydrogen sulfide ($H_2S$), and sulfur dioxide. The term alkali metal as used herein is intended to define the metals of Group I of the periodic table of the elements. The persulfate polymerization catalyst is activated by the water-soluble inorganic compound of sulfur having a reducing action, which lowers the induction period preceding the initiation of the polymerization. The activators are also useful in providing a convenient method for regulating the molecular weight of the polymer, the molecular weight being a function of the quantity of activator employed. The quantity of persulfate catalyst can be varied, depending on the conditions of polymerization and the quantity of material being polymerized. Generally, we have found that from 0.5 to 2.5 per cent by weight, based on the materials being polymerized, is sufficient for the purposes of our invention. Especially useful polymers have been obtained when about 2 per cent by weight of persulfate was employed. The quantity of water-soluble inorganic compound of sulfur used as an activator can be varied, the amount used being somewhat arbitrary. Generally, from 0.5 to 7 molar equivalents of the activator for each molar equivalent of persulfate catalyst, are adequate for practicing the process of our invention. A more limited range which we have found to be useful is from 1 to 2 molar equivalents of the activator for each molar equivalent of the persulfate polymerization catalyst, especially where from 1 to 2 per cent by weight, based on the total weight of polymerizable materials present, of persulfate polymerization catalyst is used. Larger or smaller amounts of the activator can be used, although there is ordinarily no advantage in doing so. About 5 molar equivalents of activator for each equivalent of persulfate has been found to give especially good results. The amount of oxygen acid of sulfur selected from those described above is usually from 1 to 3 molar equivalents for each molar equivalent of the persulfate catalyst and the activator combined.

The polymer which precipitates from the aqueous solution is separated and washed several times to free the polymer from excess acid and occluded catalyst or activator. It is not necessary to remove all of the oxygen acid of sulfur from the polymer, since we have found that small amounts actually have a beneficial effect when the polymer is dissolved in a solvent for spinning. This process is more fully described in our application Serial No. 49,655, filed on September 16, 1948, now U. S. Patent 2,503,245, dated April 11, 1950.

The following examples will more fully describe the manner whereby we carry out the process of our invention.

EXAMPLE I 2 gms. (0.013 mole) of benzenesulfonic acid were dissolved in 200 cc. of distilled water, and 0.2 gm. (0.001 mole) of ammonium persulfate and 0.4 gm. (0.004 mole) of sodium bisulfite were added and dissolved. While slowly stirring the solution 20 gms. (0.38 mole) of freshly distilled acrylonitrile were added. The polymerization began almost immediately as evidenced by the formation of a fine, white precipitate. After all of the acrylonitrile had gone into solution, the stirring was discontinued. At the end of 16 hours, the reaction mixture was filtered with the aid of suction, and the filter cake washed free of acid with distilled water and dried. The polyacrylonitrile dissolved readily in dimethylformamide and N,N-dimethylacetamide to form smooth, clear viscous solutions, which gave lustrous, white fibers when spun into a precipitating bath.

EXAMPLE II 2 gms. (0.012 mole) of p-toluenesulfonic acid were dissolved in 200 cc. of distilled water, and 0.2 gm. (0.001 mole) of ammonium persulfate and 0.4 gm. (0.004 mole) of sodium bisulfite were added and dissolved. While slowly stirring the solution 20 gms. (0.38 mole) of freshly distilled acrylonitrile were added. The polymerization began almost immediately as evidenced by the formation of a fine, white precipitate. After all of the acrylonitrile had gone into solution, the stirring was discontinued. At the end of 16 hours, the reaction mixture was filtered with the aid of suction, and the filter cake washed free of acid with distilled water and dried. The polyacrylonitrile dissolved readily in dimethylformamide and N,N-dimethylacetamide to form smooth, clear viscous solutions, which gave lustrous, white fibers when spun into a precipitating bath.

EXAMPLE III 2 gms. (0.021 mole) of methanesulfonic acid were dissolved in 200 cc. of distilled water and 0.2 gm. (0.001 mole) of ammonium persulfate and 0.4 gm. (0.004 mole) of sodium bisulfite were added and dissolved. While slowly stirring the solution 20 gms. (0.38 mole) of freshly distilled acrylonitrile were added. The polymerization began almost immediately as evidenced by the formation of a fine, white precipitate. After all of the acrylonitrile had gone into solution, the stirring was discontinued. At the end of 16 hours, the reaction mixture was filtered with the aid of suction, and the filter cake washed free of acid with distilled water and dried. The polyacrylonitrile dissolved readily in dimethylformamide and N,N-dimethylacetamide to form smooth, clear viscous solutions, which gave lustrous, white fibers when spun into a precipitating bath.

EXAMPLE IV 2 gms. (0.018 mole) of ethanesulfonic acid were dissolved in 200 cc. of distilled water, and 0.2 gm. (0.001 mole) of ammonium persulfate and 0.4 gm. (0.004 mole) of sodium bisulfite were added and dissolved. While slowly stirring the solution 20 gms. (0.38 mole) of freshly distilled acrylonitrile were added. The polymerization began almost immediately as evidenced by the formation of a fine, white precipitate. After all of the acrylonitrile had gone into solution, the stirring was discontinued. At the end of 16 hours, the reaction mixture was filtered with the aid of suction, and the filter cake washed free of acid with distilled water and dried. The polyacrylonitrile dissolved readily in dimethylformamide and N,N-dimethylacetamide to form smooth, clear viscous solutions, which gave lustrous, white fibers when spun into a precipitating bath.

The following examples illustrate some of the more conventional methods for making polyacrylonitrile which have heretofore been used in the prior art.

EXAMPLE V 200 gms. of freshly distilled acrylonitrile were added to 600 cc. of distilled water and the mixture stirred slowly to effect solution. While stirring 0.2 gm. of potassium persulfate and 2 gms. of dodecyl mercaptan were added and the mixture heated to 95° C. A precipitate began to form almost at once, and when no more precipitate separated, heating was discontinued, and the reaction mixture was cooled and filtered. The filter cake was washed with water and then dried. The dry polyacrylonitrile was soluble in dimethylformamide on heating, but the solution of the polyacrylonitrile in the dimethylformamide contained gel-like particles in suspension, and when spun into a coagulating bath gave a yarn of light brown color.

EXAMPLE VI 5 gms. of freshly distilled acrylonitrile were added to 45 cc. of distilled water, and the mixture stirred to effect solution. The mixture was then stirred while 1 gm. of hydrogen peroxide was added. The air above the mixture was replaced with nitrogen gas, and when the mixture was warmed a precipitate began to form. When no more precipitate separated out, heating was discontinued and the reaction mixture was cooled and filtered. The filter cake was washed with distilled water and then dried. The dry polyacrylonitrile was soluble in dimethylformamide on heating, but the solution of polyacrylonitrile in dimethylformamide when spun into a coagulating bath gave a yarn having a light tan color.

EXAMPLE VII 12.8 gms. of freshly distilled acrylonitrile were added to 75 cc. of distilled water, and the mixture stirred to effect solution. While slowly stirring, 0.072 gm. of ammonium persulfate and 0.144 gm. of sodium bisulfite were added and dissolved. The reaction mixture was heated to 40° C. and a precipitate began to form almost at once. When no more precipitate separated out, the reaction mixture was cooled and filtered. The filter cake was washed with distilled water and dried. The dye polyacrylonitrile was dissolved in dimethylformamide to give a light colored solution upon heating, but upon cooling the solution, gel-like particles formed. The polymer did not give solutions suitable for spinning when added to N,N-dimethylacetamide. When the solution of polyacrylonitrile in dimethylformamide was spun into a coagulating bath, light tan-colored fibers were obtained.

To further demonstrate the marked improvement in properties in the polymer obtainable in our process over those obtained previously, the transmission of light by the solutions of polyacrylonitrile obtained in the above examples was measured. The amount of transmission proved to be a reliable means for measuring the extent of solution and detection of any irregularities present. The blue light transmission is a particularly useful method of illustrating the solution properties, since blue light is more highly absorbed in a discolored solution than the other colors of the spectrum. The results obtained are given in the table below:

| Polymer of Example | Unheated Solutions,[a] Percent Blue light transmitted |
|---|---|
| I | 88 |
| II | 85 |
| III | 89 |
| IV | 83 |
| V | 3 |
| VI | 5 |
| VII | 3 |

[a] The above solutions were prepared by dispersing 0.5 gm. of the dry polymer, ground to 20 mesh size, in 10 cc. of dimethylformamide and stirring the dispersion intermittently over a period of one hour.

The above measurements were all based on the transmission of pure dimethylformamide, which was set at 100 per cent. While the blue light transmission of the dimethylformamide solutions of the polymers of Examples V to VII can be materially improved by heating the solutions, this heating further lowers the color characteristics of fibers spun from heated solutions, long periods of heating being particularly undesirable. Polymers prepared according to our process or the other dissolve readily in either dimethylformamide or N,N-dimethylacetamide without heating to form smooth, gel-free solutions, which give lustrous white fibers when spun into a coagulating bath. Another advantage in the polymers prepared according to our process is that they need not be ground to such small particle size to effect solution as the polymers prepared by methods heretofore commonly employed (which generally have to be ground to from 150 to 200 mesh particle size). As noted above, in contrast to the white fibers which can be obtained from the polymers prepared according to the process of our invention, those obtained from the polymers prepared by the methods previously employed are light tan in color.

It has been previously proposed to polymerize acrylonitrile according to a process similar to that described in Examples I to IV above, except that sulfuric acid is used to modify the pH in lieu of the acids set forth in those examples. While sulfuric acid does provide many advantages not heretofore obtainable, the induction period (i. e. time before polymerization begins, all ingredients of polymerization mixture being present) is high when sulfuric acid is used, and the rate of polymerization is slow. The following examples compare the induction periods and rates of polymerization of various methods using sulfuric acid or one of the oxygen acids of sulfur selected from those described above.

*Effect of various acids on the speed of polymerization of acrylonitrile*

The following solutions were prepared:

Solution A.—10.0 g. of methanesulfonic acid were dissolved in water to make a total volume of 100 ml.

Solution B.—10.3 g. of 95–98% sulfuric acid were dissolved in water to make a total volume of 100 ml.

Solution C.—A solution of benzenesulfonic acid in water was prepared, the solution containing 10% by weight of benzenesulfonic acid.

EXAMPLE VIII 20 ml. of distilled water, 2.0 ml. of Solution A, 1.0 ml. of a 1.0% aqueous solution of potassium persulfate, 1.0 ml. of acrylonitrile monomer and 1.0 ml. of a 1.0% aqueous solution of potassium bisulfite were placed in a glass vial which had been washed with distilled water. The vial was equipped with a polyethylene-lined cap. After the solution was completed by shaking, the time elapsed before polymerization began was measured, the polymerization being evidenced by the formation of a milky precipitate. The induction period for the polymerization was 27 minutes, i. e. 27 minutes elapsed before the onset of polymerization.

EXAMPLE IX 20 ml. of distilled water, 2.0 ml. of Solution B, 1.0 ml. of a 1.0% aqueous solution of potassium persulfate, 1.0 ml. of acrylonitrile monomer and 1.0 ml. of a 1.0% aqueous solution of potassium bisulfite were placed in a glass vial which had been washed with distilled water. The vial was equipped with a polyethylene-lined cap. After the solution was completed by shaking, the time elapsed before polymerization began was measured, the polymerization being evidenced by the formation of a milky precipitate. The induction period for the polymerization exceeded 4 hours, i. e. <4 hours elapsed before the onset of polymerization.

EXAMPLE X 20 ml. of distilled water, 2.0 ml. of Solution C, 1.0 ml. of a 1.0% aqueous solution of potassium persulfate, 1.0 ml. of acrylonitrile monomer and 1.0 ml. of a 1.0% aqueous solution of potassium bisulfite were placed in a glass vial which had been washed with distilled water. The vial was equipped with a polyethylene-lined cap. After the solution was completed by shaking, the time elapsed before polymerization began was measured, the polymerization being evidenced by the formation of a milky precipitate. The induction period for the polymerization was 41 minutes, i. e. 41 minutes elapsed before the onset of polymerization.

*Rate of polymerization*

The rate of polymerization of acrylonitrile monomer was determined by polymerization in a vacuum-jacketed flask, using the following formation:

40.0 ml. of distilled water
4.0 ml. of Solution A, B or C
2.0 ml. of acrylonitrile monomer
2.0 ml. of a 1.0% aqueous solution of potassium pyrosulfite (metabisulfite)
2.0 ml. of a 1.0% aqueous solution of potassium persulfate In each of the three formulations (i. e. with acid of Solution A, B or C), the water and acid were boiled under vacuum to remove all oxygen and the flask was filled with nitrogen gas. The monomer, catalyst (persulfate) and activator (pyrosulfite) were injected through a butyl rubber, self-sealing gasket. The temperature rise in each of the three formulations was measured over a given period (60 minutes). The temperature rise was determined inasmuch as the rate of polymerization was found to be roughly proportional to the temperature rise over a given period. Previous calibration of the apparatus showed that a temperature rise of 1.0° C. corresponded to a conversion of 12.3%. The results of the polymerizations with the acids of Solutions A, B and C are tabulated below.

| Acid | Temp. Rise over 60 minutes, °C. | Aver. Rate of Polymerization (per cent per min.) |
| --- | --- | --- |
| Methane Sulfonic Acid | 2.70 | 0.55 |
| Benzene Sulfonic Acid | 1.20 | 0.25 |
| Sulfuric Acid | <0.10 | <0.02 |

While our process has been described above with particular reference to the homopolymerization af acrylonitrile, it is to be understood that it is likewise useful in the interpolymerization of acrylonitrile with other polymerizable substances, such as acrylic acid, acrylamide, ethyl acrylate, vinyl acetate, vinyl chloride, styrene, etc., to give interpolymers which cannot be dissolved by the usual organic solvents. Such interpolymers should usually contain at least 80 per cent by weight of acrylonitrile in the polymer molecule, since polymers containing less than this amount melt at too low temperatures to warrant their use in the preparation of fibers or yarns. Generally from 6 to 9 per cent by weight of the other polymerizable material in the interpolymer is adequate for the purposes of our invention. Interpolymers, containing less than 80 per cent by weight of acrylonitrile in the polymer molecule (e. g. from 70 to 73 per cent), also can advantageously be prepared according to the process of our invention, and these interpolymers are useful where an unusually high melting polymer is not required, as, for example, in the preparation of films or sheets. The polymers prepared in accordance with the process of our invention are outstanding in their solubility properties, especially in N,N-dimethylacetamide, a solvent in which the polyacrylonitrile previously prepared is not soluble to a sufficient degree to permit spinning of fibers therefrom. As shown above, N,N-dimethyl acetamide is particularly useful in dissolving the polymers obtained in our process, since it is materially less toxic than dimethylformamide and gives solutions having greater stability when exposed to deteriorating conditions, as, for example, on standing. It can be seen that the objects set forth above have been accomplished, and that white fibers and colorless films of polyacrylonitrile are made available for the first time.

What we claim as our invention and desire secured by Letters Patent of the United States is:

1. A process for preparing polymers of acrylonitrile comprising polymerizing acrylonitrile in a solution in the presence of a persulfate polymerization catalyst, a sufficient quantity of an acid of sulfur selected from those represented by the following general formula:

$$R-SO_3H$$

wherein R represents a member selected from the group consisting of an alkyl group of from 1 to 2 carbon atoms and a mononuclear aromatic hydrocarbon group of the benzene series containing from 6 to 8 carbon atoms, to maintain a pH of from 1 to 3 during the polymerization and a water-soluble inorganic compound of sulfur selected from the group consisting of alkali metal bisulfites, ammonium bisulfite, alkali metal sulfites, ammonium sulfite, alkali metal thiosulfates, ammonium thiosulfate, alkali metal sufides, ammonium sulfides, hydrogen sulfide and sulfur dioxide.

2. A process for preparing polymers of acrylonitrile comprising polymerizing acrylonitrile in a solution in the presence of a persulfate polymerization catalyst, a sufficient quantity of an acid of sulfur selected from those represented by the following general formula:

$$R-SO_3H$$

wherein R represents an alkyl group of from one to two carbon atoms, to maintain a pH of from 1 to 3 during the polymerization and a water-soluble inorganic compound of sulfur selected from the group consisting of alkali metal bisulfites, ammonium bisulfite, alkali metal sulfites, ammonium sulfite, alkali metal thiosulfates, ammonium thiosulfate, alkali metal sulfides, ammonium sulfides, hydrogen sulfide and sulfur dioxide.

3. A process for preparing polymers of acrylonitrile comprising polymerizing acrylonitrile in a solution in the presence of a persulfate polymerization catalyst, a sufficient quantity of an acid of sulfur selected from those represented by the following general formula:

$$R-SO_3H$$

wherein R represents a mononuclear aromatic hydrocarbon group of the benzene series containing from 6 to 8 carbon atoms, to maintain a pH of from 1 to 3 during the polymerization and a water-soluble inorganic compound of sulfur selected from the group consisting of alkali metal bisulfites, ammonium bisulfite, alkali metal sulfites, ammonium sulfite, alkali metal thiosulfates, ammonium thiosulfate, alkali metal sulfides, ammonium sulfides, hydrogen sulfide and sulfur dioxide.

4. A process for preparing polymers of acrylonitrile comprising polymerizing acrylonitrile in an aqueous solution in the presence of a persulfate polymerization catalyst, a sufficient quantity of an acid of sulfur selected from those represented by the following general formula:

$$R-SO_3H$$

wherein R represents an alkyl group of from 1 to 2 carbon atoms, to maintain a pH of from 1 to 3 during the polymerization and an alkali metal bisulfite.

5. A process for preparing polymers of acrylonitrile comprising polymerizing acrylonitrile in an aqueous solution in the presence of a persulfate polymerization catalyst, a sufficient quantity of an acid of sulfur selected from those represented by the following general formula:

$$R-SO_3H$$

wherein R represents a mononuclear aromatic hydrocarbon group of the benzene series containing from 6 to 8 carbon atoms, to maintain a pH of from 1 to 3 during the polymerization and an alkali metal bisulfite.

6. A process for preparing polymers of acrylonitrile comprising polymerizing acrylonitrile in an aqueous solution in the presence of a persulfate polymerization catalyst, a sufficient quantity of ethanesulfonic acid to maintain a pH of from 1 to 3 during the polymerization and an alkali metal bisulfite.

7. A process for preparing polymers of acrylonitrile comprising polymerizing acrylonitrile in an aqueous solution in the presence of a persulfate polymerization catalyst, a sufficient quantity of methanesulfonic acid to maintain a pH of from 1 to 3 during the polymerization and an alkali metal bisulfite.

8. A process for preparing polymers of acrylonitrile comprising polymerizing acrylonitrile in an aqueous solution in the presence of a persulfate polymerization catalyst, a sufficient quantity of benzenesulfonic acid to maintain a pH of from 1 to 3 during the polymerization and an alkali metal bisulfite.

9. A process for preparing polymers of acrylonitrile comprising polymerizing acrylonitrile in an aqueous solution in the presence of a persulfate polymerization catalyst, a sufficient quantity of p-toluenesulfonic acid to maintain a pH of from 1 to 3 during the polymerization and an alkali metal bisulfite.

10. A process for preparing a homopolymer of acrylonitrile comprising polymerizing acrylonitrile in an aqueous solution in the presence of a persulfate polymerization catalyst, a sufficient quantity of ethanesulfonic acid to maintain a pH of from 1 to 3 during the polymerization and an alkali metal bisulfite.

11. A process for preparing a homopolymer of acrylonitrile comprising polymerizing acrylonitrile in an aqueous solution in the presence of a persulfate polymerization catalyst, a sufficient quantity of methanesulfonic acid to maintain a pH of from 1 to 3 during the polymerization and an alkali metal bisulfite.

12. A process for preparing a homopolymer of acrylonitrile comprising polymerizing acrylonitrile in an aqueous solution in the presence of a persulfate polymerization catalyst, a sufficient quantity of benzenesulfonic acid to maintain a pH of from 1 to 3 during the polymerization and an alkali metal bisulfite.

13. A process for preparing a homopolymer of acrylonitrile comprising polymerizing acrylonitrile in an aqueous solution in the presence of a persulfate polymerization catalyst, a sufficient quantity of p-toluenesulfonic acid to maintain a pH of from 1 to 3 during the polymerization and an alkali metal bisulfite.

References Cited in the file of this patent

UNITED STATES PATENTS

| | | |
|---|---|---|
| 2,462,422 | Plambeck | Feb. 22, 1949 |
| 2,628,223 | Richards | Feb. 10, 1953 |